(12) United States Patent
Theios

(10) Patent No.: US 9,150,449 B2
(45) Date of Patent: Oct. 6, 2015

(54) SUBSTRATES OR ASSEMBLIES HAVING TWO-COLOR LASER-FUSED FRITS, AND/OR METHOD OF MAKING THE SAME

(75) Inventor: Jason E. Theios, Toledo, OH (US)

(73) Assignee: Guardian Industries Corp., Auburn Hills, MI (US)

( * ) Notice: Subject to any disclaimer, the term of this patent is extended or adjusted under 35 U.S.C. 154(b) by 799 days.

(21) Appl. No.: 13/168,212

(22) Filed: Jun. 24, 2011

(65) Prior Publication Data

US 2012/0328803 A1 Dec. 27, 2012

(51) Int. Cl.
| | | |
|---|---|---|
| *B32B 17/06* | (2006.01) | |
| *C03C 23/00* | (2006.01) | |
| *C03C 17/34* | (2006.01) | |
| *B41M 5/26* | (2006.01) | |
| *B41M 7/00* | (2006.01) | |

(52) U.S. Cl.
CPC .............. *C03C 23/0025* (2013.01); *B41M 5/26* (2013.01); *C03C 17/3411* (2013.01); *B41M 7/009* (2013.01); *C03C 2217/216* (2013.01); *C03C 2217/256* (2013.01); *C03C 2217/72* (2013.01); *C03C 2217/73* (2013.01); *C03C 2217/944* (2013.01); *Y10T 428/24926* (2015.01)

(58) Field of Classification Search
CPC .......... B32B 3/10; B32B 3/66; B32B 3/6715; B32B 33/00; B32B 17/10174; B32B 17/10247; B32B 2451/00; E06B 3/66; E06B 3/6715; Y02B 80/24; C03C 2217/72; C03C 17/3411; C03C 2217/216; C03C 2217/256; C03C 2217/73; C03C 2217/944; Y10T 428/24926

USPC .................. 428/34, 201, 203, 204, 207, 210; 52/204.59, 786.1

See application file for complete search history.

(56) References Cited

U.S. PATENT DOCUMENTS

| | | | | |
|---|---|---|---|---|
| 4,600,630 A | * | 7/1986 | Quinn et al. ................... | 428/203 |
| 4,791,010 A | * | 12/1988 | Hanley et al. .................. | 428/34 |
| 4,997,687 A | * | 3/1991 | Carter ............................. | 428/34 |

(Continued)

FOREIGN PATENT DOCUMENTS

| | | |
|---|---|---|
| DE | 215 776 | 11/1984 |
| EP | 1 040 017 | 8/2008 |

(Continued)

OTHER PUBLICATIONS

U.S. Appl. No. 12/929,741, filed Feb. 11, 2011; Walp.

(Continued)

*Primary Examiner* — Donald J Loney
(74) *Attorney, Agent, or Firm* — Nixon & Vanderhye P.C.

(57) ABSTRACT

Certain example embodiments relate to substrates or assemblies having two-colored laser-fused frits, and/or methods of making the same. In certain example embodiments, a first pattern is formed or written on a glass sheet by laser fusing a first frit material to the glass sheet. A second pattern is formed by laser fusing a second frit material disposed on the first frit material. An optional thin film coating is supported by the glass sheet. The glass sheet with the first and second patterns and optional coating is cut prior to heat treatment. A YAG or other type of laser may be used to directly or indirectly heat the frit materials, at the same or different times, and the frit materials may be wet-applied to the substrate. In certain instances, the laser firing raises the temperature of the glass substrate to no more than 100 degrees C. or preferably even lower.

1 Claim, 7 Drawing Sheets

(56) References Cited

U.S. PATENT DOCUMENTS

| | | | |
|---|---|---|---|
| 5,275,869 A * | 1/1994 | Lin | 428/195.1 |
| 5,325,220 A * | 6/1994 | Saxe | 349/147 |
| 5,341,157 A | 8/1994 | Campagna et al. | |
| 5,421,256 A | 6/1995 | Cutcher | |
| 5,766,702 A * | 6/1998 | Lin | 428/13 |
| 5,827,581 A * | 10/1998 | Cobb et al. | 428/13 |
| 6,075,223 A | 6/2000 | Harrison | |
| RE37,186 E * | 5/2001 | Hill | 428/187 |
| 6,238,847 B1 | 5/2001 | Axtell, III et al. | |
| 6,635,846 B1 | 10/2003 | Rieck | |
| 6,650,470 B1 | 11/2003 | Turner et al. | |
| 6,834,583 B1 | 12/2004 | Miller et al. | |
| 7,238,396 B2 | 7/2007 | Rieck | |
| 7,604,736 B2 | 10/2009 | Medley | |
| 7,652,305 B2 | 1/2010 | Chatterjee et al. | |
| 7,858,191 B2 | 12/2010 | Lemmer et al. | |
| 7,892,604 B2 | 2/2011 | Veerasamy | |
| 7,892,662 B2 | 2/2011 | Veerasamy et al. | |
| 2003/0012891 A1 | 1/2003 | Hory et al. | |
| 2003/0180475 A1 | 9/2003 | Lunsford et al. | |
| 2003/0198808 A1 * | 10/2003 | Muromachi et al. | 428/359 |
| 2007/0056961 A1 * | 3/2007 | Shimatani et al. | 219/729 |
| 2007/0092295 A1 | 4/2007 | Price et al. | |
| 2009/0233513 A1 | 9/2009 | Lee et al. | |
| 2012/0048722 A1 * | 3/2012 | McLean et al. | 204/192.1 |

FOREIGN PATENT DOCUMENTS

| | | | |
|---|---|---|---|
| WO | WO 99/29519 | | 6/1999 |
| WO | WO 2006/051238 | | 5/2006 |
| WO | WO-2010/076563 | * | 7/2010 |

OTHER PUBLICATIONS

U.S. Appl. No. 12/929,740, filed Feb. 11, 2011; Walp.
U.S. Appl. No. 12/926,714, filed Feb. 26, 2010; Lemmer et al.
U.S. Appl. No. 12/923,082, filed Aug. 31, 2010; McLean et al.
U.S. Appl. No. 12/662,894, filed May 10, 2010; Lemmer et al.
U.S. Appl. No. 12/659,196, filed Feb. 26, 2010; Lemmer et al.
U.S. Appl. No. 12/385,234, filed Feb. 27, 2004; Lemmer et al.
U.S. Appl. No. 12/385,802, filed Jan. 19, 2005; Lu et al.
U.S. Appl. No. 12/461,792, filed Sep. 18, 2006; Blacker et al.
U.S. Appl. No. 12/591,611, filed Dec. 21, 2006; Veerasamy.
U.S. Appl. No. 12/654,594, filed Mar. 15, 2007; Blacker et al.
U.S. Appl. No. 12/662,077, filed Oct. 26, 2006; Veerasamy.
U.S. Appl. No. 12/801,848, filed Jan. 30, 2009; Veerasamy.
U.S. Appl. No. 12/923,775, filed Jan. 29, 2007; Murphy et al.
U.S. Appl. No. 12/923,778, filed Jan. 29, 2007; Murphy et al.
U.S. Appl. No. 12/929,252, filed Jan. 11, 2011; Veerasamy.
U.S. Appl. No. 12/923,146, filed Sep. 3, 2010; Broadway et al.
U.S. Appl. No. 12/923,838, filed Oct. 8, 2010; Broadway et al.
U.S. Appl. No. 12/929,481, filed Jan. 27, 2011, Broadway et al.
U.S. Appl. No. 12/662,443, filed Apr. 16, 2010; Wang et al.
U.S. Appl. No. 11/412,118, filed Apr. 27, 2006; Veerasamy et al.
International Search Report dated Oct. 29, 2012.

* cited by examiner

SUBSTRATES OR ASSEMBLIES HAVING TWO-COLOR LASER-FUSED FRITS, AND/OR METHOD OF MAKING THE SAME

This application incorporates by reference the entire contents of U.S. application Ser. Nos. 12/929,740 and 12/929,741, both of which were filed on Feb. 11, 2011.

Certain example embodiments of this invention relate to patterned substrates, and/or methods of patterning substrates. More particularly, certain example embodiments of this invention relate to substrates or assemblies having two-color laser-fused frits, and/or methods of making the same. In certain example embodiments, (1) a first pattern is formed or written on a stock glass sheet by laser fusing a first frit material to the glass sheet, (2) a second pattern is formed or written by laser fusing a second frit material on the first frit material or pattern, (3) an optional thin film coating is disposed on and supported by the stock glass sheet, and (4) the stock glass sheet with the first and second patterns and the optional thin film coating is cut prior to heat treatment (e.g., heat strengthening and/or thermal tempering). In certain example embodiments, the first and/or second patterns may be formed by direct and/or indirect laser fusing techniques at the same or different times.

BACKGROUND AND SUMMARY OF EXAMPLE EMBODIMENTS OF THE INVENTION

Ceramic frit patterns currently are applied to interior and exterior glass surfaces using known silkscreen or inkjet processes. These processes typically require the entire glass system to be heated to temperatures above 500 degrees C. to fire the frit into the glass, creating a strong bond. The patterned glass optionally may be coated with a thin film coating over the ceramic frit pattern. The thus patterned and optionally coated glass may be used monolithically or built into an insulated glass (IG) unit. Typically, the surface that is patterned and optionally coated is disposed on the second surface from the sun.

FIG. 1 is a flowchart illustrating a current process for silkscreen printing a pattern on a substrate. As shown in FIG. 1, bulk glass is produced or provided in step S102. This mother substrate is then cut into appropriate sizes in step S104. The silkscreen pattern is then applied to the sized pieces in step S106, and the patterned cut pieces of glass are heat treated (e.g., heat strengthened or thermally tempered) in step S108. The high temperature process used to fire the frit is commonly conducted during the heat treating, although this is not always the case. A separate drying and/or firing process may sometimes be used; however, having separate high temperature processes for firing the frit and for heat treating the patterned substrate may be undesirable from cost perspectives (e.g., in terms of equipment costs), as well as time perspectives (e.g., as delays may be caused by multiple high-temperature heating and subsequent cooling processes). Referring once again to FIG. 1, an optional thin film coating is disposed on the heat treated pieces (e.g., via sputtering or the like) in step S110. The cut, patterned, tempered, and optionally coated pieces may be used monolithically or built into an IG unit in step S112.

The inkjet process involves a similar flow to that described above in connection with FIG. 1.

FIG. 2 is a plan view of a substrate 200 having an example frit pattern 202 formed or written thereon. As is common, the cut, patterned, tempered, and optionally coated pieces may be used in a wide variety of applications including, for example, windows in commercial settings where some light blockage is desirable, vehicle windshields (e.g., at or around the periphery of the windshield), in residential settings, etc.

The heat treatment (e.g., tempering) typically involves quenching. As will be appreciated, the heat treated products cannot be further cut or sized. Thus, in conventional process flows, as indicated above, the cutting must take place before the heat treatment. And to save on high temperature process steps, the frit typically is fired together with the heat treatment as indicated above.

Unfortunately, the current process flow suffers from several inefficiencies and further improvements are desirable. For example, silkscreen and inkjet printing processes are performed on the cut substrates, prior to heat treatment. By contrast, thin film deposition is performed after the heat treatment, e.g., to help ensure the survivability of the coating. The patterning and thin film coating of cut sheets, however, introduces inefficiencies as compared to patterning and coating the large, stock sheets of glass. Yield may be reduced, and patterning and/or coating processes may be complicated by the need to deal with multiple different sizes of cut glass substrates.

Thus, it will be appreciated that there is a need in the art for improved techniques for applying frit patterns to substrates.

Certain example embodiments of this invention relate to a method of making a coated article. A frit material is applied to a glass substrate (e.g., via a suitable wet technique). The frit material is selectively fired via a laser source (e.g., a solid state laser such as a YAG laser) so as to form or write a predetermined pattern, wherein a laser from the laser source directly or indirectly (e.g., through a or the substrate) contacts the frit material. Non-fired frit material is removed from the glass substrate (e.g., via washing). The glass substrate is cut following said removing in making the coated article. The cut coated article may be heat treated in certain example embodiments. In certain example embodiments, a thin film coating may be deposited, directly or indirectly, on the substrate prior to said cutting.

Certain example embodiments of this invention relate to a method of making an insulated glass (IG) unit is provided. A second substrate is positioned in substantially parallel, spaced apart relation to the above-described or other coated article made. A spacer is provided between the coated article and the second substrate. In certain example embodiments, where a thin film coating is provided, the coating may be located on surface 2 of the IG unit.

Certain example embodiments of this invention relate to a heat treatable coated article, comprising: a first glass substrate; a laser-fired frit material formed or written on the substrate in a predetermined pattern; and a heat treatable sputter-, PVD- or CVD-deposited coating formed over the substrate and the laser-fired frit material. The visible light transmission in regions of the coated article with the patterned frit material thereon is less than 25% post heat treatment in certain example embodiments. An IG unit incorporating the same or a similar coated article may be provided in certain example embodiments.

Certain example embodiments of this invention relate to a laser heating system. A conveyor system is provided. Laser firing means are provided for laser heating frit material applied to a glass substrate, with the laser firing means including a YAG laser source and being controllable to directly or indirectly (e.g., through a or the substrate) heat the frit material without raising the substrate temperature above 50 degrees C. At least one processor is configured to control the laser firing means so as to form or write a predetermined pattern in the frit material.

Recently, there has been a desire for silk-screen patterns and colors to enhance the appearance and solar control properties of glass fenestration systems. It oftentimes is desirable to make a pattern of a first color visible from a first side of the substrate or unit and a second color visible from a second side of the substrate or unit, with the patterns typically being the same for both sides. Some current products involve using silk screens to deposit different colors that are visible from the interior and or exterior of the substrate, e.g., with one color on top of, or aligned with, the other. In some cases, each color is applied to a different surface of a substrate or multi-pane window unit.

Unfortunately, however, the colors may become misaligned as a result of the silk-screening, printing, and/or assembly process(es), both colors may be visible from one or both sides of the assembly even when alignment is proper, etc. Indeed, dot registration is very often challenging in an analog printing process, such as silk-screening. Such analog processes typically involve application of high temperatures (typically above 500 degrees C., as described above) to fire each colored frit onto the glass. In conventional processes, each color is fired by a separate high-temperature process and, as described above, at least one high temperature process is conducted during a heat treatment (e.g., thermal tempering) process. Thus, as described above, another drawback associated with conventional two-color systems relates to the fact that the thus heat treated screen-printed sheets cannot be subsequently cut.

Thus, it will be appreciated that there is a need for improved silk screen coverage with different observable colors when viewed from the different sides (e.g., interior and exterior) of the substrate or assembly.

Certain example embodiments of this invention relate to a method of making a coated article. A first frit material is applied to a glass substrate having first and second major surfaces. The first frit material is selectively fired via a laser source so as to form or write a first predetermined pattern covering a substantial portion (e.g., at least 30%) of the first major surface of the glass substrate. A second frit material is applied over at least a portion of the first frit material and over the first major surface of the glass substrate. The second frit material is selectively fired via a or the laser source so as to form or write a second predetermined pattern covering a substantial portion of the glass substrate. Non-fired first frit material is removed from the glass substrate. Non-fired second frit material is removed from the glass substrate. After firing, the first and second frit materials cause visible characteristics (e.g., coloration) of the coated article to differ based on the major surface from which the coated article is viewed.

According to certain example embodiments, the first and second frit materials may be dried and/or allowed to dry (together or in sequence) prior to the firing of one or both of the frit materials.

According to certain example embodiments, non-fired first and second frit materials may be removed together in a single washing step, or they may be removed separately (e.g., in sequence).

In certain example embodiments, an IG or VIG unit may be made by positioning a second substrate in substantially parallel, spaced apart relation to a coated article made according to this or a similar method, and providing a spacer between the coated article and the second substrate.

Certain example embodiments relate to a heat treatable coated article. A first glass substrate is provided. A first laser-fired frit pattern is formed or written on a majority of a first major surface of the substrate. A second laser-fired frit pattern formed or written on the first laser-fired frit pattern. A heat treatable sputter-, PVD-, or CVD-deposited coating is formed over the substrate and the first and second laser-fired frit patterns. The visible transmission of the coated article with the first and second patterned frit patterns thereon is less than 25% post heat treatment. The first and second laser-fired frit patterns cause visible characteristics of the coated article to differ based on the major surface from which the coated article is viewed.

Certain example embodiments relate to a laser heating system. A conveyor is provided. Laser firing means are provided for laser heating first and second frit materials applied to a glass substrate, the laser firing means including a YAG laser source and being controllable to heat the first and second frit materials without raising the substrate temperature above 50 degrees C. At least one processor is configured to control the laser firing means so as to form or write a predetermined pattern in the first and second frit materials.

According to certain example embodiments, the laser firing means comprises first and second laser sources for selectively firing the first and second frit materials, respectively. The first and second laser sources may be in line and on a common side of the glass substrate. Alternatively, the first and second laser sources may be on opposite sides of the glass substrate, and/or the first laser source may indirectly fire the first frit material through the glass substrate and the second laser source may directly fire the second frit material.

According to certain example embodiments, the first and second frit materials are selectively fired using only one laser source. The first and second frit materials may be selectively fired at substantially the same time The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to substrates or assemblies having laser-fused frits, and/or methods of making the same. In certain example embodiments, (1) a pattern is formed or written on a stock glass sheet by laser fusing frit material to the glass sheet, (2) an optional thin film coating is disposed on and supported by the stock glass sheet, and (3) the stock glass sheet with the pattern and the optional thin film coating is cut prior to heat treatment (e.g., heat strengthening and/or thermal tempering). The laser fusing technique is fast and need not necessarily heat the entire substrate to the frit firing temperature. In other words, the laser may selectively heat a ceramic frit on the glass, either directly or indirectly. Thus, in certain example embodiments, a laser focused on the surface of the frit may help fuse it to the glass without having to thermally treat the entire glass system. The glass substrate with the frit pattern thereon may still be in the annealed state and thus may still be cut. The patterned glass may or may not be coated with a thin film coating prior to heat treatment. Large sheets of patterned glass with the coating on the substrate (and possibly over the pattern) may be cut to custom sizes, then heat treated, and used monolithically or in an insulated glass unit.

Figure 1:
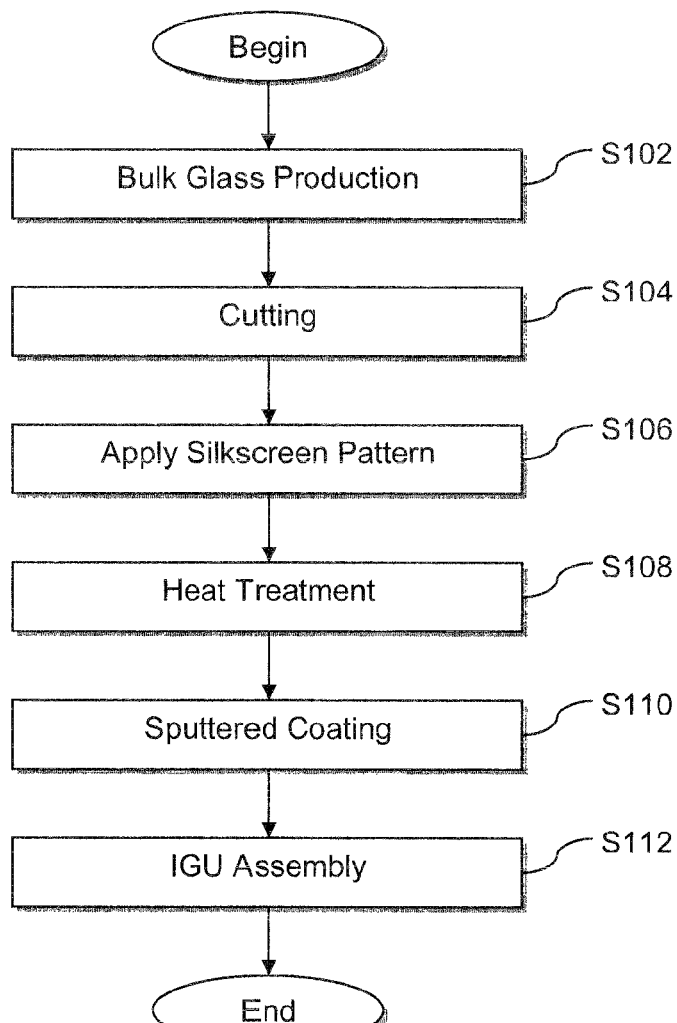
FIG. 1 is a flowchart illustrating a current process for silkscreen printing a pattern on a substrate.
Figure 3:
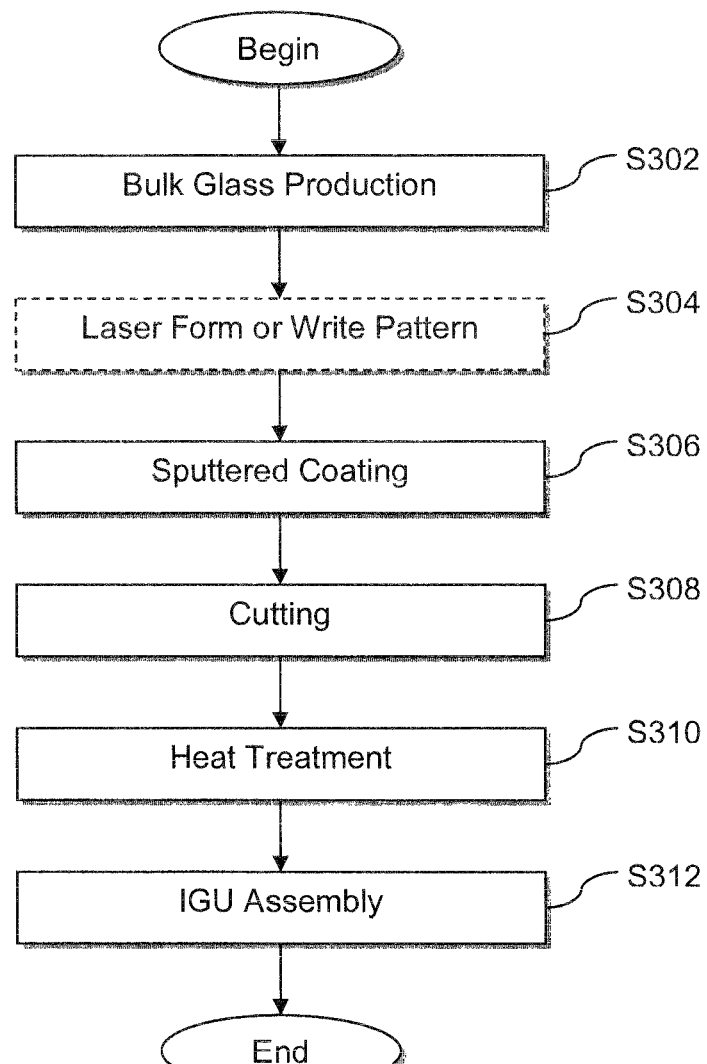
FIG. 3 is a flowchart illustrating an improved process for forming or writing a frit pattern on a substrate in accordance with certain example embodiments.

Referring now more particularly to the drawings in which like numerals indicate like parts throughout the several views, FIG. 3 is a flowchart illustrating an improved process for forming or writing a frit pattern on a substrate in accordance with certain example embodiments. Similar to as shown in FIG. 1, in FIG. 3, bulk glass is produced or provided in step S302. A frit pattern is then formed or written in step S304, example details of which are provided below. In step S306, a thin film coating that is capable of surviving the heat treatment process may be applied over the substrate and over the frit pattern. In certain example embodiments, however, the thin film coating may be disposed over the substrate and the frit pattern may be disposed over the thin film coating. The mother glass substrate may be cut or sized in step S308 and forwarded on for heat treatment (e.g., heat strengthening or tempering) in step S310. The resulting substrates may be used in monolithic applications or, in the alternative, they may be built into IG units in step S312. It will be appreciated that a monolithic article may be forwarded to a different party, e.g., for IG unit fabrication, in certain example embodiments.

Figure 4:
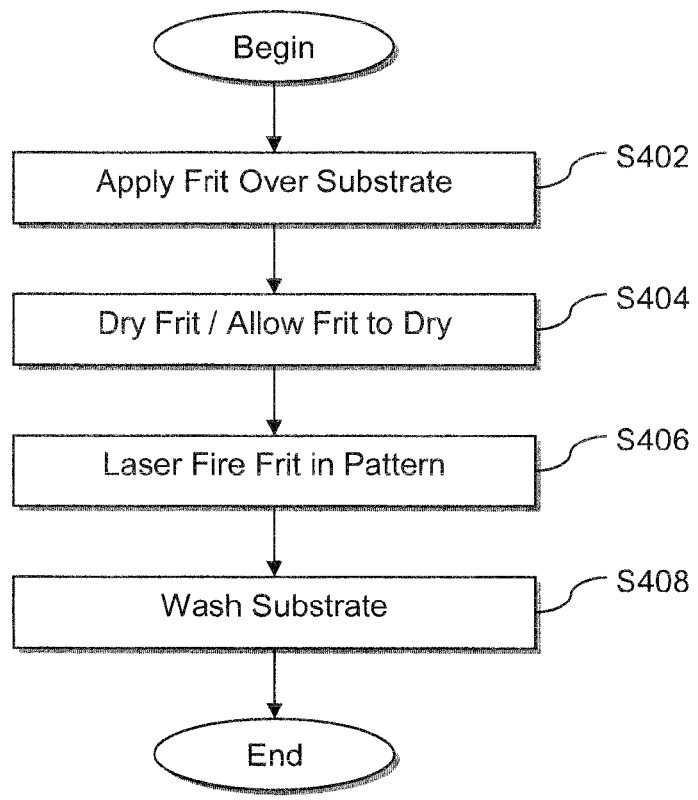
FIG. 4 is a flowchart illustrating an example laser firing process in accordance with certain example embodiments.

FIG. 4 is a flowchart illustrating an example laser firing process in accordance with certain example embodiments. As shown in FIG. 4, in step S402, frit material is applied over the substrate. The frit may be applied to the substrate by any suitable means including wet techniques such as, for example, curtain coating, roll coating, spin coating, coating via a Mayer rod, etc. The frit material may be applied to the entire, substantially the entire, or only portions of the substrate, depending on the desired end product. Masks optionally may be used to help control where the frit material is applied.

The frit material may be applied to a suitable thickness such that a desired opacity or transparency is obtained at the end of the process. It will be appreciated that the relationships between the thickness initially put down, the final thickness, opacity/transparency, etc., may vary based on the frit material. Example frit materials that are usable in connection with certain embodiments of this invention include the LMC98 frit commercially available from TherMark. CerMark type frits, frits produced by Ferro, etc. A final thickness of 50-100 microns, more preferably 60-90 microns, and sometime around 77 microns is suitable for the LMC98 frit for various commercial applications. It will be appreciated that Ferror and other companies provide a wide range of frit materials that may be used in connection with different embodiments of this invention.

The frit material, once applied, may be dried or allowed to dry in step S404. Many frit materials will dry in about 10 minutes at room temperature. However, if faster dry times are desired, heat may be applied. For instance, a temperature of 250-450 degrees F., more preferably 300-400 degrees F., and sometimes around 356 degrees F. may help speed the drying process.

The frit material may be laser fired in step S406 so as to help ensure that it is fused, welded, or otherwise attached to the glass substrate. Any suitable laser may be used in certain example embodiments. It has been observed, however, that solid state (e.g., YAG) lasers are particularly advantageous as compared to other types of lasers (including, for example, $CO_2$ lasers). A 20 watt YAG laser at 100% power may be used. When a YAG laser is used, a wavelength of between about 1.03-2.0 microns may be used. In certain example embodiments, a 1064 nm wavelength operating at a frequency of 100 kHz may be used. The YAG laser wavelength has been found to be advantageous in certain example implementations, e.g., compared to $CO_2$ lasers, as YAG lasers have been found to provide better consistency and $CO_2$ lasers have been observed as operating at wavelengths that damage the underlying glass substrate. A linear speed of 40"/second is possible using a 20 watt YAG laser operating at 100% power. However, it is possible to move to a higher wattage lasers (e.g., a 50 watt laser, etc.) in different embodiments, e.g., to increase speed.

A strike distance of $\frac{1}{1000}$th of an inch is possible using a YAG laser and has been found to provide the desired opacity. The pattern may be predetermined and stored to a non-transitory computer storage medium, readable by at least one processor of a laser control system. The laser may be controlled via the control system so as to create the predetermined pattern.

If the frit is water soluble, the excess material (e.g., where the frit is not fused by virtue of laser exposure) may be washed off in step S408. Mechanical brushing or other means may be provided in addition or in the alternative in different embodiments of this invention.

Figure 5:
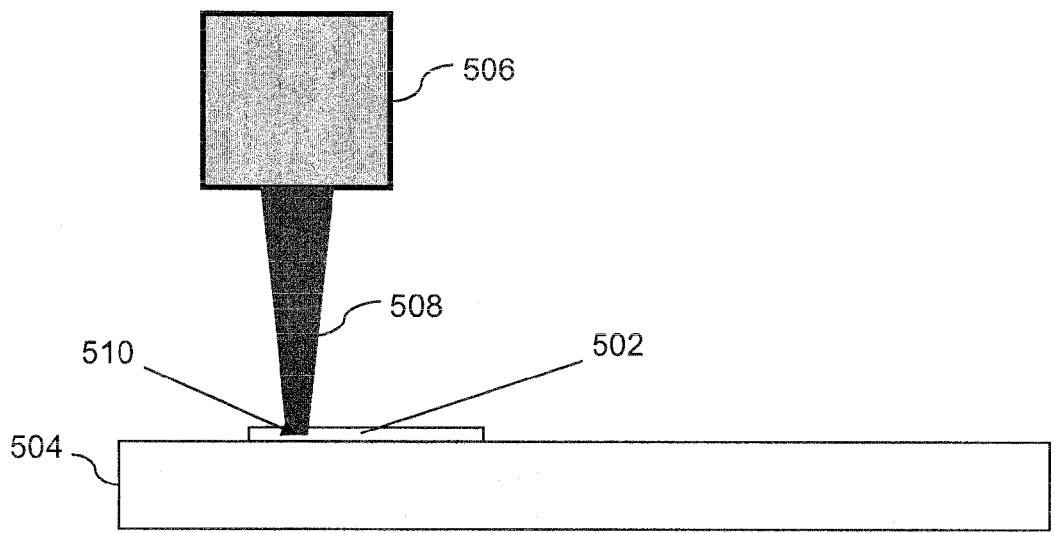
FIG. 5 is a schematic view of a laser directly heating frit material in forming or writing a pattern in accordance with certain example embodiments.
Figure 6:
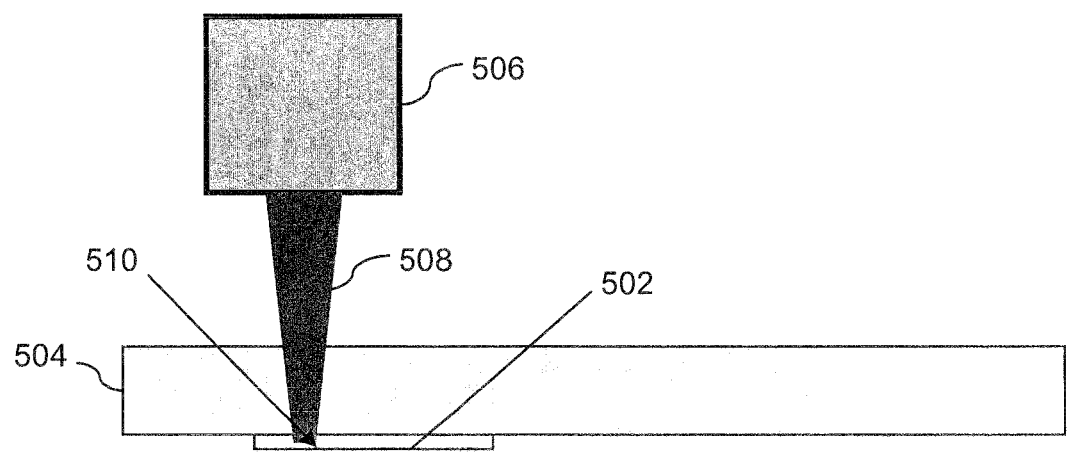
FIG. 6 is a schematic view of a laser indirectly heating frit material in forming or writing a pattern in accordance with certain example embodiments.

FIG. 5 is a schematic view of a laser directly heating frit material in forming or writing a pattern in accordance with certain example embodiments, and FIG. 6 is a schematic view of a laser indirectly heating frit material in forming or writing a pattern in accordance with certain example embodiments. The coated frit material 502 is supported by the glass substrate 504. The laser source 506 emits a laser 508 where the frit material is to be patterned, creating a selective laser heating area 510. FIGS. 5 and 6 are similar to one another, except that the laser directly laser heats the frit 502 in FIG. 5 and indirectly laser heats the frit 502 in FIG. 6. That is, in the FIG. 5 example, the laser source 506 and the laser 508 are provided on the same side of the substrate 504 as the frit 502. By contrast, in the FIG. 6 example, the laser source 506 is provided on a side of the substrate 504 opposite to the frit 502, and the laser 508 extends through the substrate 504.

In one or both arrangements, there is no intentional heating of the substrate. Rather, the frit itself is heated to a suitable firing temperature (e.g., typically around 650 degrees C. for many commercially available frits). The frits of certain example embodiments may be heated up to the glass softening point, e.g., up to about 725 degrees C. depending on the type of underlying substrate used, in certain example embodiments of this invention. With the direct laser heating method in FIG. 5, the glass temperature is raised to a temperature less than 50 degrees C. The indirect laser heating method of FIG. 6 may raise the glass temperature somewhat higher than in the FIG. 5 example; however, the temperature of the glass preferably remains less than 100 degrees C. and likely somewhere in the 50-100 degree C. range. In both cases, however, the glass can be safely handled by humans immediately after the laser heating.

It surprisingly and unexpectedly has been found that indirect heating methods such as those shown in FIG. 6 provide better results than those in FIG. 5. For instance, it has been found that the indirect heating in FIG. 6 enables a lower opacity to be obtained. One example direct laser heating application provided 25-30% visible transmission, whereas one example indirect laser heating application provided 19% visible transmission.

The resolution is "sharper," e.g., as measured at the edges of the pattern. It is believed that the direct heating techniques of FIG. 5 involve patterning a more three-dimensional surface, whereas the indirect heating techniques of FIG. 6 provide a more two-dimensional or planar surface to be patterned, e.g., because the interface between glass surface and the frit is very smooth.

Although the laser sources are shown "above" the frit in the FIG. 5 and FIG. 6 examples, different arrangements are possible. For example, for direct laser heating embodiments, the laser source may be located below a conveyor on which the substrate travels, provided that the frit-side is facing downward. The laser from the laser source may fire the frit according to the pattern via a window or gaps between the rollers. A number of different arrangements also are possible for indirect laser heating embodiments. For instance, the laser source may be provided below a conveyor, with the coating side up, and with the laser being aimed between the rollers or through a gap or window. As another example arrangement for indirect laser heating, the laser source may be provided above the substrate with the frit side facing down (e.g., towards the rollers). An optional removable glass or other substrate may be provided between the rollers and the frit material. This protective sheet may be removed prior to washing, etc.

It will be appreciated that two or more lasers may be used in certain example embodiments. The two or more lasers may be provided on a common side of the substrate, e.g., so that each of the lasers directly heats or indirectly heats the frit material. However, in certain example embodiments, two or more lasers may be provided, with at least one laser provided on a first side of the substrate and with at least one laser provided on the opposite side of the substrate. Thus, certain example embodiments may allow for simultaneous laser heating from above and below. Such simultaneous laser heating from above and below may in certain example instances be focused on the same areas or on different areas, e.g., potentially allowing for both direct and/or indirect heating at the same time on the same or different areas.

Figure 7:
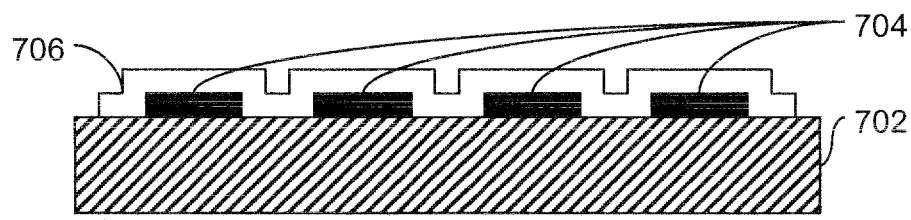
FIG. 7 is an illustrative coated article including a laser fused frit pattern in accordance with certain example embodiments.

FIG. 7 is an illustrative coated article including a laser fused frit pattern in accordance with certain example embodiments. FIG. 7 shows a substrate 702 supporting a frit 704 that has been laser patterned. A thin-film coating 706 is provided over the substrate 702 and the patterned frit 704. Although a single layer 706 is shown, it will be appreciated that single layer or multi-layer coatings may be provided. Such coatings may be sputter deposited, PVD deposited, CVD deposited, etc., and such coatings may be capable of surviving high temperatures in the event that they are disposed before heat treatment. Of course, such layers also may be disposed after heat treatment in certain example embodiments. In certain example embodiments, the coatings may serve low-E, protective/durable, antimicrobial, anticondensation, antireflective, and/or other features. For example, the coating 706 may be a SunGuard low-E coating, a DiamondGuard protective coating, a ClimaGuard coating, a ShowerGuard coating, etc., e.g., as known and provided by the assignee of the instant invention.

Example low-E and/or anticondensation coatings are described in, for example, application Ser. Nos. 12/926,714; 12/923,082; 12/662,894; 12/659,196; 12/385,234; 12/385,802; 12/461,792; 12/591,611; and 12/654,594, the entire contents of which are hereby incorporated herein by reference. Example protective coatings are described in, for example, application Ser. Nos. 12/662,077; 12/801,848; 12/923,775; 12/923,778; and 12/929,252, the entire contents of which are hereby incorporated herein by reference. Example three-layer AR coatings also are disclosed in co-pending and commonly assigned application Ser. Nos. 12/923,146 and 12/923,838, the entire contents of which are hereby incorporated herein by reference. Example four-layer AR coatings also are disclosed in co-pending and commonly assigned application Ser. No. 12/929,481 (filed on Jan. 27, 2011 under atty. dkt. no. 3691-2239 and entitled "HEAT TREATABLE FOUR LAYER ANTI-REFLECTION COATING"), which also is incorporated herein by reference. Example anti-bacterial and/or anti-fungal coatings are described in, for example, application Ser. Nos. 12/662,443 and 11/412,118, the entire contents of which are hereby incorporated herein by reference.

Figure 8:
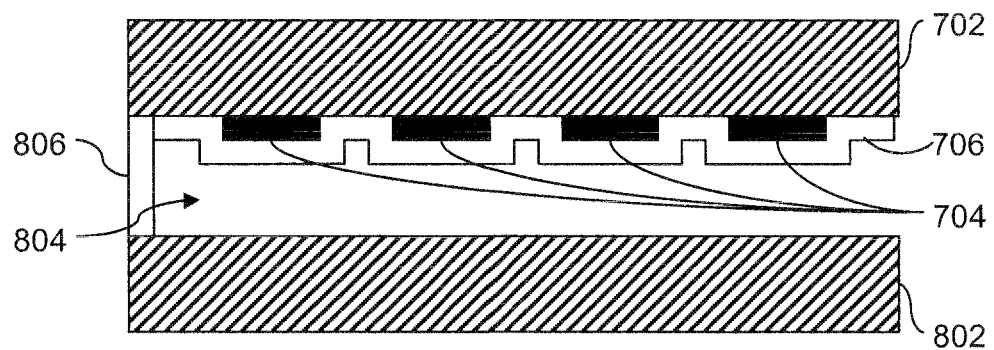
FIG. 8 is an illustrative insulated glass (IG) unit having an illustrative coated article including a laser fused frit pattern in accordance with certain example embodiments.

The FIG. 7 example may be suitable for monolithic applications. However, the FIG. 7 example coated article may be built into an IG unit in certain example instance. In that regard. FIG. 8 is an illustrative insulated glass (IG) unit having an illustrative coated article including a laser fused frit pattern in accordance with certain example embodiments. The FIG. 7 example coated article is spaced apart from a second substrate 802, and a gap 804 is formed therebetween. A spacer 806 is provided at the periphery of the substrates and helps to maintain the first and second substrates 702 and 802 in substantially parallel, spaced apart relation to one another.

The coating 706 is shown on surface 2 of the IG unit (e.g., on an inner surface facing the gap 804 of the outer substrate 702 that is nearest the sun). Additional thin film coatings may be provided, for example, on other surfaces of the IG unit in different example embodiments.

It will be appreciated that the example coated article shown in FIG. 7 also may be used in vacuum insulated glass (VIG) units in certain example embodiments of this invention.

Although the end applications vary, typical silkscreen printing provides 15-20% visible transmission in the regions of frit application. Overall visible light transmission may depend at least in part on the percent area the frit covers. The techniques disclosed herein may be capable of meeting or approximating this range.

Figure 2:
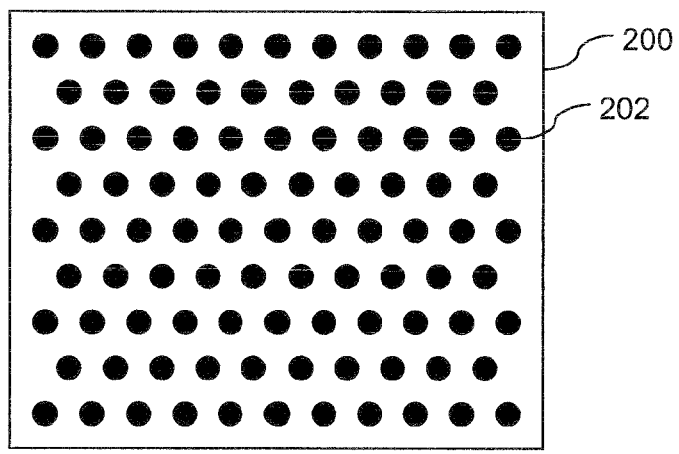
FIG. 2 is a plan view of a substrate having an example frit pattern formed or written thereon.

It will be appreciated that the techniques described herein may be used to produce coated articles suitable for a wide variety of applications including, for example, windows in commercial settings where some light blockage is desirable, vehicle windshields (e.g., at or around the periphery of the windshield), in residential settings, etc. Although an example pattern and an example shape for individual fired frit elements are shown in FIG. 2 (e.g., as a "dot pattern"), other patterns, shapes, sizes, etc., may be used in different embodiments of this invention. The example frit materials described herein at least initially are white but are fired to darker or more opaque colors. However, different embodiments may involve frit materials with different starting and/or ending colors.

Although certain example embodiments have been described in connection with glass substrates, the techniques described herein may apply with respect to substrates made of other materials. Thus, while the glass substrates of certain example embodiments may be borosilicate glass, soda lima glass, or other forms of glass, other substrates such as plastic substrates, polymer substrates, etc., may benefit from the example techniques described herein.

As indicated above, there recently has been a desire for silk-screen patterns and colors to enhance the appearance and solar control properties of glass fenestration systems. Certain example embodiments address this need by using two-color laser fused frit techniques. More particularly, in certain example embodiments, (1) a first pattern is formed or written on a stock glass sheet by laser fusing a first frit material to the glass sheet, (2) a second pattern is formed or written by laser fusing a second frit material on the first frit material or pattern, (3) an optional thin film coating is disposed on and supported by the stock glass sheet, and (4) the stock glass sheet with the first and second patterns and the optional thin film coating is cut prior to heat treatment (e.g., heat strengthening and/or thermal tempering). In certain example embodiments, the first and/or second patterns may be formed by direct and/or indirect laser fusing techniques at the same or different times.

Figure 9:
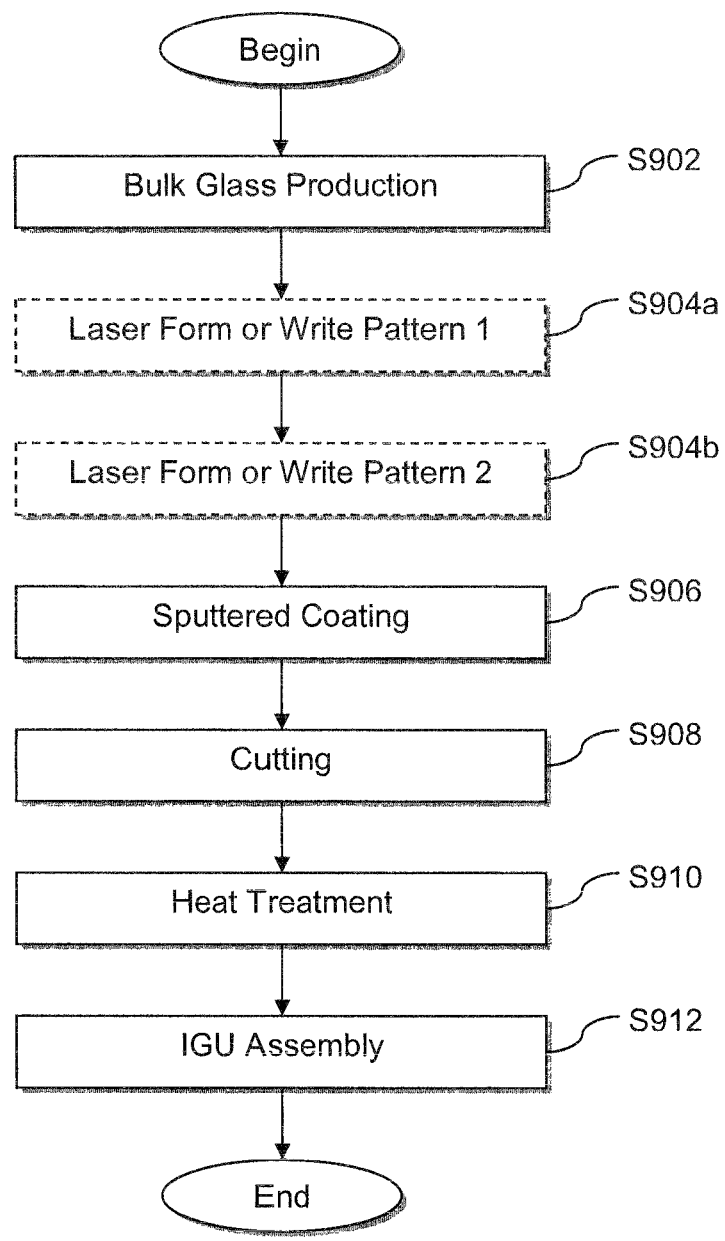
FIG. 9 is a flowchart illustrating an improved process for forming or writing first and second frit patterns on a substrate in accordance with certain example embodiments.

FIG. 9 is a flowchart illustrating an improved process for forming or writing first and second frit patterns on a substrate in accordance with certain example embodiments. Similar to as shown in FIG. 3, in FIG. 9, bulk glass is produced or provided in step S902. A first frit pattern is then formed or written in step S904a, and a second frit pattern is then formed or written in step S904b. Example details involved in forming the frit patterns individually are provided above. It will be appreciated that the frit material for the second frit pattern may be disposed on the frit material for first frit pattern. Moreover, the first frit material may be dried and/or fused to the substrate separate from, or together with, the second frit material. In other words, in certain example embodiments, the first frit material may be applied, dried, and fused, and then after the first frit pattern is formed, the second frit material may be applied, dried, and fused to form the second frit pattern. In certain other example embodiments, however, the first frit material may be applied and dried, then the second frit material may be applied and dried, and they may be laser fused at substantially the same time. As described in greater detail below, one or more passes with one or more lasers may be used to accomplish the same in different embodiments of this invention.

Steps S904a and/or S904b may be the substantially the same as or different from step S304 described above in connection with FIG. 3 and shown and described in detailed in connection with FIG. 4. Thus, it will be appreciated that the same or different types of lasers and/or control/process conditions may be used in different embodiments of this invention when a two-color laser frit pattern is desirable.

In step S906, a thin film coating that is capable of surviving the heat treatment process may be applied over the substrate and over the frit pattern. In certain example embodiments, however, the thin film coating may be disposed over the substrate and the frit pattern may be disposed over the thin film coating. The mother glass substrate may be cut or sized in step S908 and forwarded on for heat treatment (e.g., heat strengthening or tempering) in step S910. The resulting substrates may be used in monolithic applications or, in the alternative, they may be built into IG units in step S912. It will be appreciated that a monolithic article may be forwarded to a different party, e.g., for IG unit fabrication, in certain example embodiments.

It will be appreciated that the first and second frit materials may be the same or different materials in different embodiments of this invention. In certain example embodiments, the same base compositions may be used but different pigments may be included so as to change the ultimate aesthetic appearances from the different sides of the substrate (e.g., such that one color is visible from a first side and a second color is visible from a second side). In certain example embodiments, different colors may be obtained by using the same material but applying different laser fusing powers, densities, or the like, so as to cause desired chemical changes to respective desired degrees.

Thus, in certain example embodiments, two different materials may be used in two discrete layers. In other example embodiments, the same material may be used in two discrete layers, and they may be treated in the same or different ways to achieve the same or different desired aesthetic and/or functional (e.g., light blocking, reflective, absorbing, etc.) effects. In still other example embodiments, one frit material may be used in a single layer, with different portions of the layer being treated differently by one or more lasers to achieve different desired aesthetic and/or functional effects. For instance, the first half of a layer closer to the substrate may be treated with a first laser to produce effects suitable for viewing from a first side of the substrate, whereas the second half of the layer farther from the substrate may be treated with the same laser operating under different conditions or with a second laser to produce different effects suitable for viewing from a second side of the substrate. In still other example embodiments, graded effects may be obtained by one or more lasers.

Figure 10:
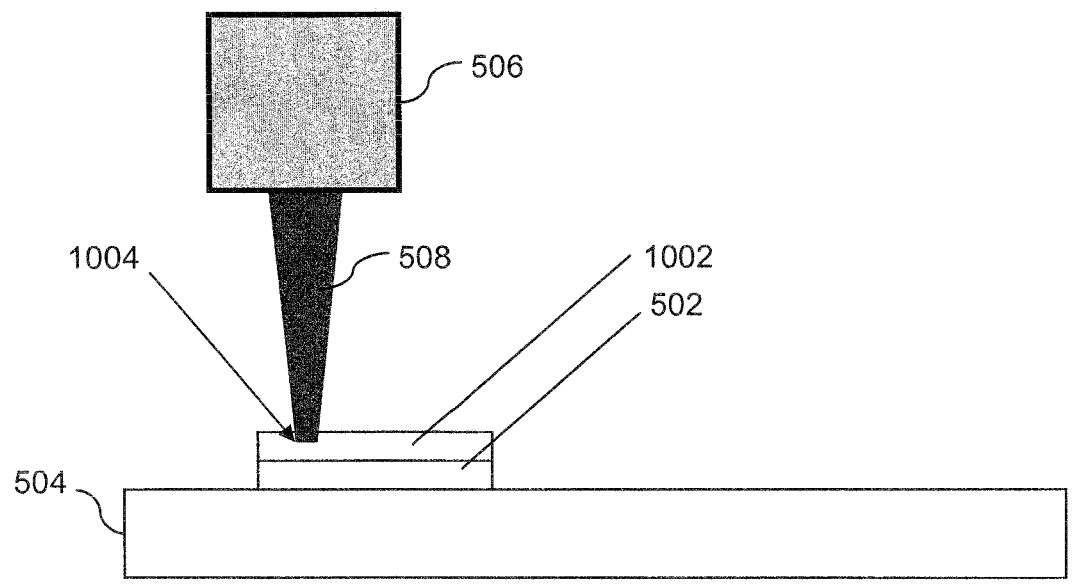
FIG. 10 is a schematic view of a laser directly heating a second frit material disposed over a first frit material in accordance with certain example embodiments.

FIG. 10 is a schematic view of a laser directly heating a second frit material disposed over a first frit material in accordance with certain example embodiments. In FIG. 10, first coated frit material 502 is laser fused to the substrate 504. Second coated frit material 1002 is disposed over and contacting the first coated frit material. It is then fused to the first frit material via the laser source 506 which, as indicated above, emits a laser 508 where the frit material is to be patterned, creating a selective laser heating area 1004. It is noted that the disposed second frit material may be dried or allowed to dry prior to laser firing. It will be appreciated that the use of a laser may be advantageous in connection with a two-colored frit pattern, inasmuch as the alignment issues that are a part of the analog screen printing may not be as pronounced when a high resolution laser is used, with or without additional tracking or positioning devices. It also will be appreciated that the first frit material 502 may be fused via direct or indirect laser fusing techniques (e.g., as shown and described in connection with FIG. 5 or 6). In certain example embodiments, it may be advantageous to indirectly laser fuse the first frit material to provide a perhaps more uniform surface on which the second frit material 1002 may be located.

Figure 11:
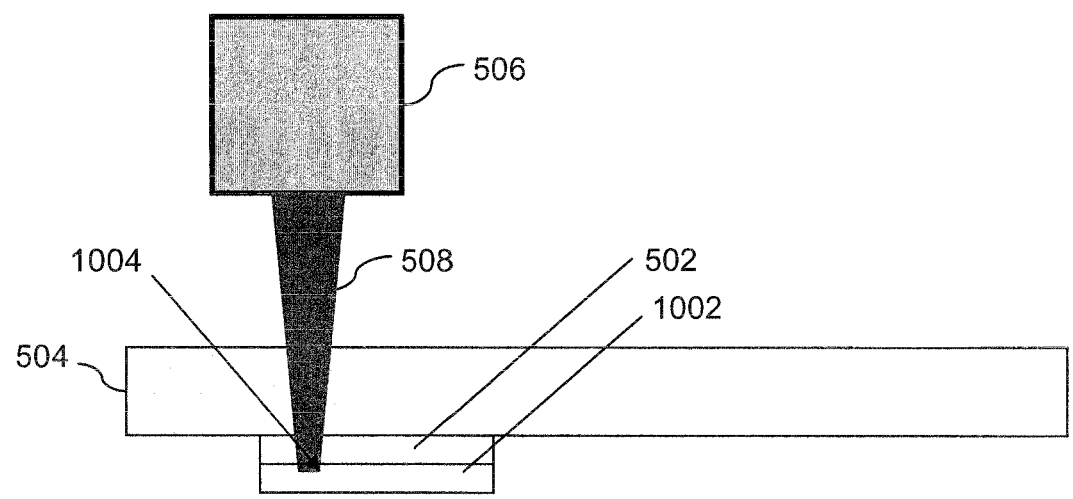
FIG. 11 is a schematic view of a laser indirectly heating a second frit material disposed over a first frit material in accordance with certain example embodiments.

FIG. 11 is similar to FIG. 10, in the sense that FIG. 11 is a schematic view of a laser indirectly heating a second frit material disposed over a first frit material in accordance with certain example embodiments. As in FIG. 10, first coated frit material 502 is laser fused to the substrate 504. Second coated frit material 1002 is disposed over and contacting the first coated frit material. It is then fused to the first frit material via the laser source 506 which, as indicated above, emits a laser 508 where the first frit material is to be patterned, creating a selective laser heating area 1004. As above, the first frit material 502 may be fused via direct or indirect laser fusing techniques (e.g., as shown and described in connection with FIG. 5 or 6).

Figure 12:
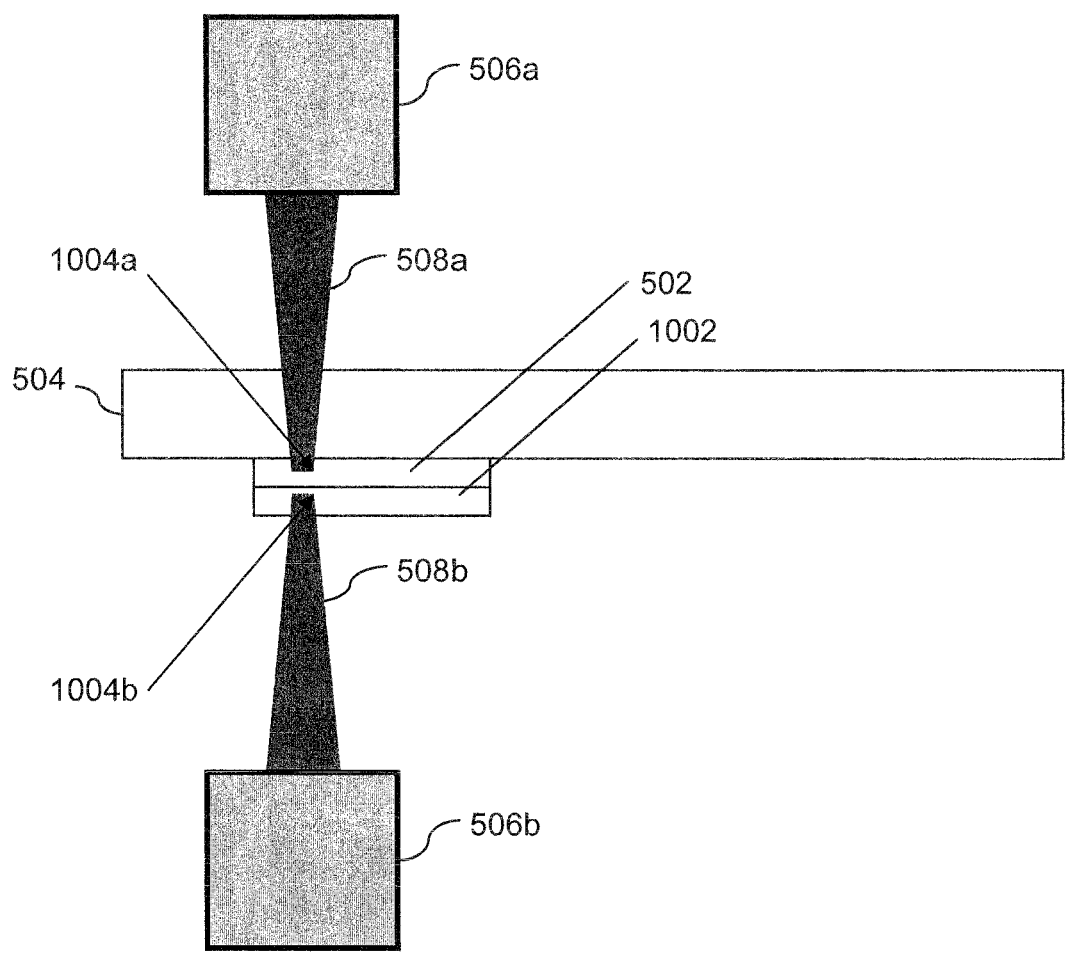
FIG. 12 is a schematic view of lasers directly and indirectly heating first and second frit materials disposed in first and second patterns, respectively, in accordance with certain example embodiments.

FIG. 12 is a schematic view of lasers directly and indirectly heating first and second frit materials disposed in first and second patterns, respectively, in accordance with certain example embodiments. The first frit material 502 is disposed on the substrate 504, and the second frit material 1002 is disposed on the first frit material 504. The disposing of the second frit material 1002 may, for example, take place after the first frit material is dried or allowed to dry. In any event, a first laser source 506a emits a first laser 508a, which selectively heats a portion 1004a of the first frit material 502. Similarly, a second laser source 506b emits a second laser 508b, which selectively heats a portion 1004b of the second frit material 1002.

As shown in the FIG. 12 embodiment, the first laser source 506a indirectly heats the first frit material 502 (through the supporting substrate 504) because the first frit material 502 is located between the substrate 504 and the second frit material 1002. By contrast, the second laser source 506b directly heats the second frit material 1002 because it is an outermost layer. It will be appreciated that the first and second laser sources 506a and 506b may operate at substantially the same or different times. For instance, in certain example embodiments, the first and second frit materials may be laser fused at the same time, whereas the first frit material may be fused first and the second frit material fused second in different embodiments, etc. In certain example embodiments, the fusing of the first frit material 502 may help to dry the second frit material 1002 and prepare the second frit material 1002 for subsequent laser firing.

Figure 13:
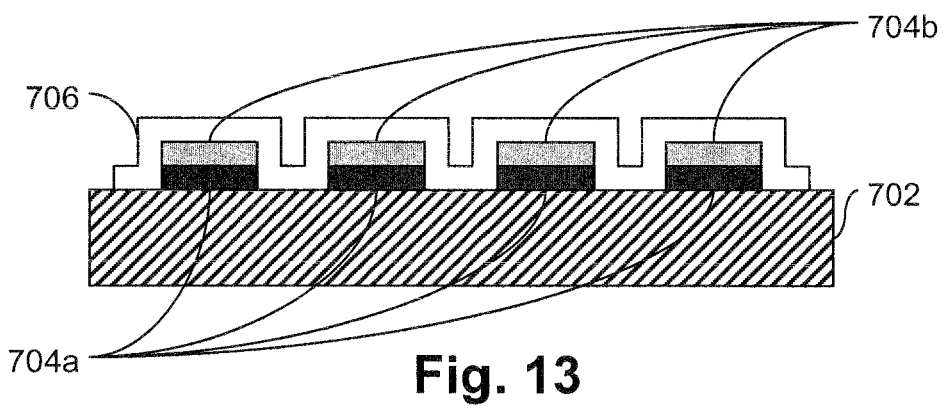
FIG. 13 is an illustrative coated article including first and second laser fused frit patterns in accordance with certain example embodiments.

FIG. 13 is an illustrative coated article including first and second laser fused frit patterns in accordance with certain example embodiments. FIG. 13 thus is similar to FIG. 7, in that FIG. 13 shows a substrate 702 supporting a first frit material 704a that has been laser patterned. The first laser-patterned frit material 704a is disposed on the substrate 702, and a second laser-patterned frit material 704b is disposed on the first frit material 704a. The first and second first material 704a and 704b have different aesthetic and/or optical/functional properties, e.g., so that a first color and/or pattern is visible from a first side of the substrate and a second color and/or pattern is visible from the second side of the substrate.

A thin-film coating 706 is provided over the substrate 702 and the patterned frit 704 (including the first and second frit materials 704a and 704b). Although a single layer 706 is shown, it will be appreciated that single layer or multi-layer coatings may be provided. Such coatings may be sputter deposited, PVD deposited, CVD deposited, etc., and such coatings may be capable of surviving high temperatures in the event that they are disposed before heat treatment. Of course, such layers also may be disposed after heat treatment in certain example embodiments.

The FIG. 13 example coated article may be suitable for monolithic applications. However, the FIG. 13 example coated article may be built into an IG or VIG unit in certain example instance, similar to the way in which the FIG. 7 article may be built into the FIG. 8 IG unit.

As indicated above, the same or different patterns may be used for the first and second frit materials. For example, the same frit patterns may be used such that there is a substantial overlap and alignment between the two frit materials. In certain example embodiments, the rate of overlap and alignment may be at least about 80%, more preferably at least about 90%, still more preferably at least about 95%, and in some cases closer to 97-99%). The accuracy in size and position of the two patterns that help result in the high rates of overlap and alignment advantageously is made possible through one or more digitally controlled laser sources that are capable of firing the frit materials with sufficient resolution. These and/or other registration techniques may be used in connection with certain example embodiments. The degree of overlap may be adjusted, for example, to compensate for incidental softening or bleeding of the frit material(s) (e.g., the overlying frit materials) that may result from heat generated by the laser(s). In such cases, it may be desirable to make the underlying frit material slightly larger than the overlying frit layer when a more exact degree of overlap is desired.

Of course, other example embodiments need not involve overlapping patterns and/or completely aligned patterns. For instance, it may sometimes be desirable to provide different shapes and/or sizes to provide for different visual effects on the different sides. As one example, one frit material may have a smaller dot pattern that is subsumed within a larger dot pattern of the second frit material. As another example, substantially circular dots may be surrounded by square dots, or vice versa. Other shapes, sizes, degrees of overlap and/or alignment, etc., are of course possible in different embodiments of this invention.

When certain example two-color laser-fired frit techniques are used, certain example embodiments may have the same or similar visible transmission as those described above. Similarly, the glass temperatures may be held to the same or similar temperatures as those described above when certain example two-color laser-fired frit techniques are used.

In certain example embodiments, it may be advantageous to use two colors to achieve desired aesthetic effects that could not be achieved with a single color. For instance, for architectural design purposes, it may be desirable to use a reflective type frit that produces a white or other colored light, e.g., at night. This might not otherwise be possible, however, because the light-colored frit material may not meet the desired opacity requirements during the daytime, for example. However, by providing a more opaque frit pattern "underlayer" and a reflective frit material thereon, it may be possible to achieve the desired light reflecting off the outer frit while maintaining the desired opacity under other conditions. It will be appreciated that this technique may be used to create the same or different aesthetic patterns and/or effects on both major surfaces of the substrate or unit.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A heat treatable coated article, comprising:
 a first glass substrate having a first major surface and a second major surface opposite to the first major surface;

a first laser-fired frit pattern formed on a majority of the first major surface of the substrate;

a second laser-fired frit pattern formed on the first laser-fired frit pattern; and a heat treatable low-E coating formed over the substrate and the first and second laser-fired frit patterns, wherein the low-E coating comprises an infrared (IR) reflecting layer comprising silver located over and directly contacting a dielectric layer comprising zinc oxide, the low-E coating further comprising a dielectric layer located over at least the IR reflecting layer comprising silver, wherein the visible transmission of the coated article with the first and second frit patterns and the low-E coating thereon is less than 25% post heat treatment, and wherein the first and second laser-fired frit patterns cause visible characteristics of the coated article to differ based on the major surface from which the coated article is viewed, so that the coated article has a first visible characteristic when viewed from the first major surface of the substrate and has a second visible characteristic when viewed from the second major surface of the substrate, the first and second visible characteristics being different from each other.

* * * * *